(12) United States Patent
De Bortoli (10) Patent No.: US 6,207,470 B1
(45) Date of Patent: Mar. 27, 2001

(54) METHOD FOR MANUFACTURING A PRESSURE-MEASURING DEVICE EQUIPPED WITH A RESONATING ELEMENT

(75) Inventor: Eros De Bortoli, Cesiomaggiore (IT)

(73) Assignee: ABB Kent Taylor S.p.A., Lenno (IT)

( * ) Notice: Subject to any disclaimer, the term of this patent is extended or adjusted under 35 U.S.C. 154(b) by 0 days.

(21) Appl. No.: 09/186,647

(22) Filed: Nov. 6, 1998

(51) Int. Cl.[7] .................................................. H01L 21/00
(52) U.S. Cl. ................................ 438/53; 438/50; 438/51
(58) Field of Search .................................. 438/50, 51, 52, 438/53; 73/717–728

(56) References Cited

U.S. PATENT DOCUMENTS

| | | | |
|---|---|---|---|
| 5,553,506 | | 9/1996 | Benz et al. |
| 5,646,072 | * | 7/1997 | Maudie et al. .......................... 438/53 |
| 5,654,244 | * | 8/1997 | Sakai et al. ............................ 438/53 |
| 5,945,605 | * | 8/1999 | Julian et al. ........................... 73/727 |
| 5,969,257 | * | 10/1999 | De Bortoli ............................. 73/702 |
| 5,994,161 | * | 11/1999 | Bitko et al. ............................ 438/53 |
| 6,038,928 | * | 3/2000 | Maluf et al. ........................... 439/53 |
| 6,063,645 | * | 5/2000 | Tasi et al. .............................. 438/50 |
| 6,066,882 | * | 5/2000 | Kato ...................................... 438/51 |
| 6,069,392 | * | 5/2000 | Tai et al. ................................ 73/724 |

FOREIGN PATENT DOCUMENTS

| | | |
|---|---|---|
| 0 456 029 | | 9/1996 (EP) . |
| 0855583 | * | 7/1998 (EP) . |

* cited by examiner

Primary Examiner—Kevin M. Picardat
(74) Attorney, Agent, or Firm—Guido Modiano; Albert Josif; Daniel O'Byrne (57) ABSTRACT

Method for manufacturing a pressure-measuring device comprising a diaphragm of semiconductor material having a resonating element fixed thereto, said diaphragm being exposed to the pressure of a process fluid, wherein it comprises the following phases:
i) machining a multilayer semiconductor material to obtain a diaphragm having on the upper side a resonating element, an excitation element and a detection element for measuring the pressure applied to said diaphragm;
ii) machining a semiconductor material having one or more layers to obtain a support having a pressure port for the flow of the process fluid;
iii) making a bond between the lower side of said diaphragm and the upper side of said support.

19 Claims, 7 Drawing Sheets

METHOD FOR MANUFACTURING A PRESSURE-MEASURING DEVICE EQUIPPED WITH A RESONATING ELEMENT

BACKGROUND OF THE INVENTION

The present invention relates to a method for manufacturing a pressure-measuring device equipped with a resonating element.

More specifically, the invention relates to a method for manufacturing a pressure-measuring device for measuring absolute, relative or differential pressure.

The pressure-measuring device that can be manufactured using the method according to the invention is, for example, of the type described in Italian patent application No. MI96A002268, filed in the name of the same applicant as the present application, the disclosure of which is incorporated herein for reference.

It is known that pressure-measuring devices can be prepared by suitably machining wafers of semiconductor-based materials.

In particular the technologies currently known and referred to as "silicon micromachining" are widely used for manufacturing sensors using silicon as the base material.

It is known that such micromachining technologies are very similar to those used for the production of microelectronic circuits. With a single process, it is possible to machine a considerable number of devices that are identical to one another with significant advantages in terms of production costs.

Micromachining generally comprises technologies such as thin layer deposition (a few microns thick) of semiconductor materials and their derivatives or metal materials, extremely precise photolithographic techniques (resolutions of less than one micron), selective removal of semiconductor material through the action of suitable chemical agents, bonding techniques on separate layers.

It is known from the literature that "silicon micromachining" technologies can be divided into two main categories known as "bulk micromachining" technologies and "surface micromachining" technologies.

The former refers to the possibility of obtaining monocrystalline structures by machining both sides of a wafer of semiconductor material, whereas the latter refers to machining performed on one side of the wafer only. "Bulk micromachining" technologies have been developed from crystal machining and are therefore highly consolidated. "Surface micromachining" technologies, on the other hand, are highly innovative compared to the former and make it possible to manufacture smaller microstructures (one order of magnitude smaller). They also offer the considerable advantage of easier machining and greater potential for integrating the structures produced with microelectronic circuits made in the same chip of semiconductor material.

The manufacture of pressure-measuring devices generally involves a number of manufacturing difficulties as described hereinafter, especially when high performances are required.

In the first place, the high number of manufacturing process phases makes the manufacture of the pressure sensor costly. Moreover, the devices of known type are often based on polysilicon and quartz and their mechanical performances are not optimal. Also, in most cases, both sides of the wafer are subjected to very critical machining steps, thus complicating the manufacturing process.

SUMMARY OF THE INVENTION

The main aim of the present invention is therefore to provide a method for manufacturing a pressure-measuring device, based on a resonating element, that is capable to give high performances.

As part of this aim, one object of the present invention is to provide a method for manufacturing a pressure-measuring device that makes it possible to integrate the resonating element of the device with the diaphragm to which the pressure is applied.

Another object of the present invention is to provide a method for manufacturing a pressure-measuring device, that enables the production in batches of the device.

Another object of the present invention is to provide a method for manufacturing a pressure-measuring device by which it is possible to produce three-dimensional structures using either technologies for machining on both sides of the wafer or technologies for machining on a single side.

A further object of the present invention is to provide a method for manufacturing a pressure-measuring device in which the resonating element operates under a high vacuum and is protected from overrange pressure pulses.

Yet another object of the present invention is to provide a method for manufacturing a pressure-measuring device in which the machining for making the resonating element is performed on one side of the wafer only.

A further though not the last object of the present invention is to provide a pressure-measuring device that is highly reliable and relatively easy to manufacture at competitive costs.

This task, as well as these and other objects that will appear more clearly hereinafter are achieved by a method for manufacturing a pressure-measuring device comprising a diaphragm of semiconductor material having a resonating element fixed thereto, said diaphragm being exposed to the pressure of a process fluid. The method of the present invention is characterised by the fact that it comprises the following phases:

i) machining a multilayer semiconductor material to obtain a diaphragm having on the upper side a resonating element, ii) machining a semiconductor material having one or more layers to obtain a support having a pressure port for the flow of the process fluid;

iii) making a bond between the lower side of said diaphragm and the upper side of said support.

The present invention is a combination of silicon and bulk micromachining technologies. This solution is particularly advantageous compared to the prior art, because it allows to perform the most critical machining steps working on a single plane even performing a three-dimensional structure.

BRIEF DESCRIPTION OF THE DRAWINGS

Further characteristics and advantages of the invention will appear more clearly from the description of a preferred but not exclusive embodiment of the device according to the invention, illustrated merely by way of example and without limitation in the attached drawings in which.

DESCRIPTION OF THE PREFERRED EMBODIMENTS

The manufacturing method according to the present invention shall now be illustrated in detail with reference to the aforementioned figures.

Figure 1:
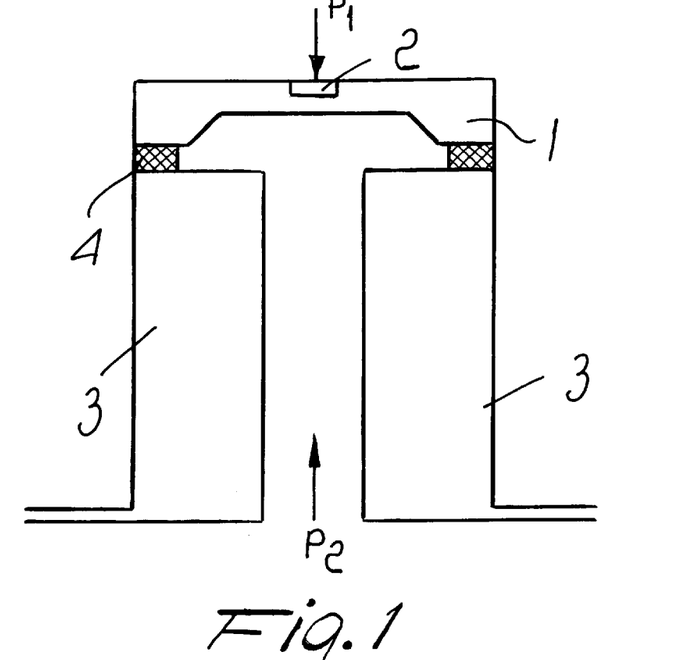
FIG. 1 shows an overall structure of the pressure-measuring device manufactured using the method according to the present invention.

FIG. 1 shows the overall structure of the device to be manufactured using the procedure as in the invention.

With reference to FIG. 1, the diaphragm 1, to which the resonating element 2 is fixed in such a way as to form an integral part of the former, is mounted on a suitable support 3 using a substrate 4 of insulating material.

The diaphragm is in this way exposed to the action of two pressures P1 and P2, the difference of which has to be measured.

Figure 2:
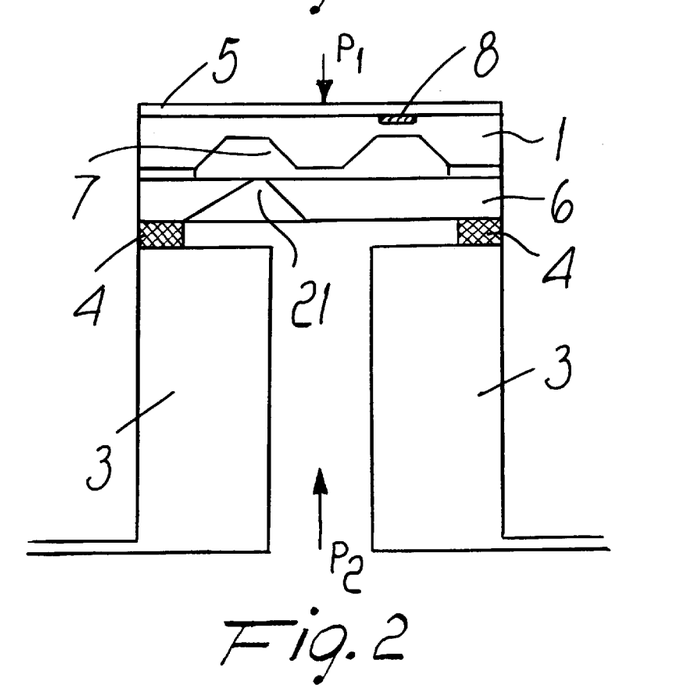
FIG. 2 shows a preferred embodiment of the pressure-measuring device manufactured using the method according to the present invention.

FIG. 2 shows a preferred embodiment of the device manufactured using the method as in the invention.

With reference to FIG. 2, the diaphragm 1 is bonded to a layer of semiconductor material 5 in order to protect the resonating element 8 and advantageously allowing it to vibrate in a cavity where a high vacuum is kept.

Bonding between the diaphragm and the layer 5 generally is carried out interposing a layer of semiconductor material (not shown in FIG. 2).

The diaphragm 1 also features a protrusion 7 on the opposite side designed to abut against the support layer of semiconductor material 6 bonded to the diaphragm 1 using a layer of insulating material.

The support layer 6 is bonded to a further support 3 using a layer of insulating material 4.

This solution makes it possible to maintain all the functions of the system while advantageously enabling very high overrange pressure pulses to be withstood.

Figure 3:
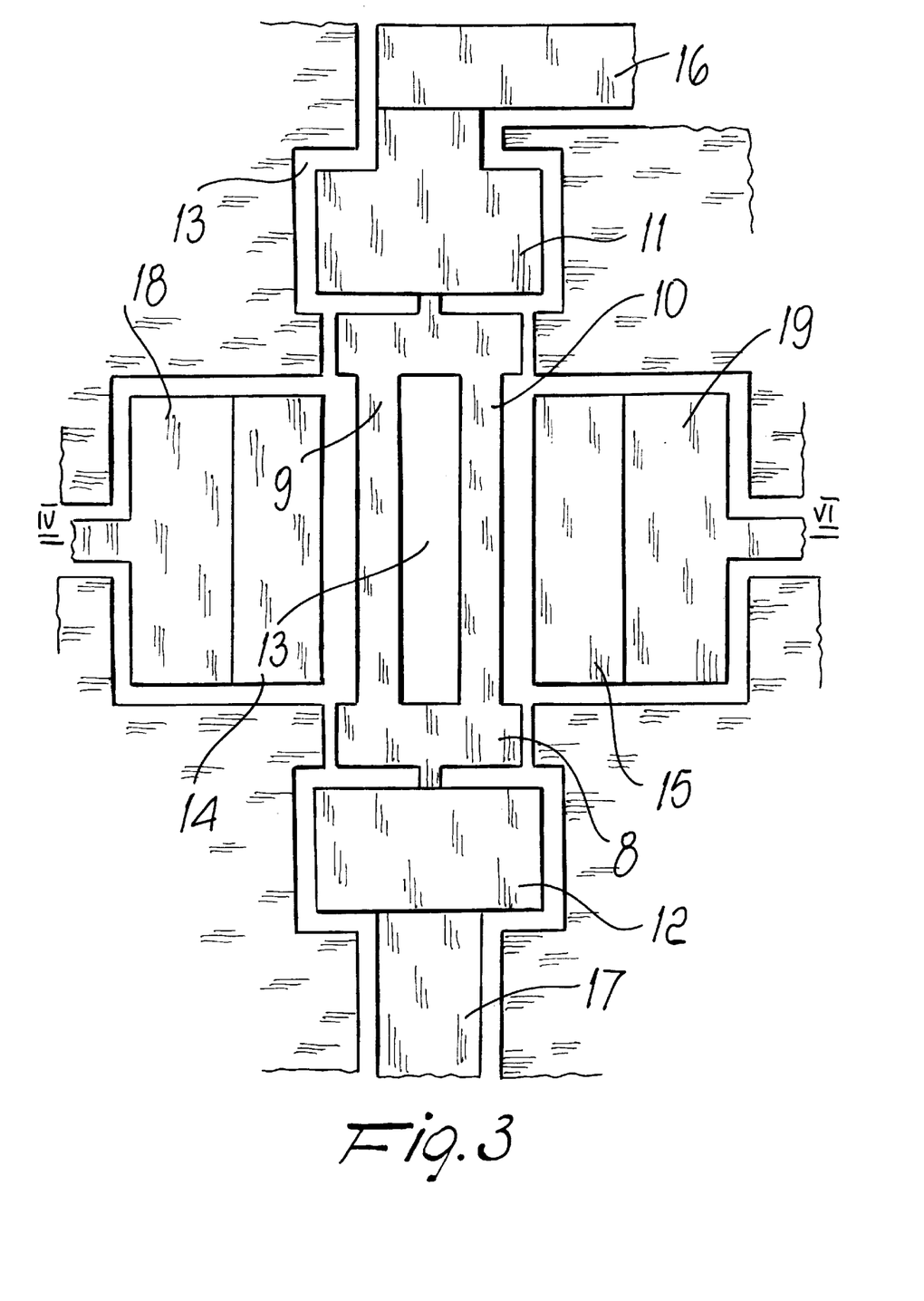
FIG. 3 is a plan view of a resonating element as in a preferred embodiment, obtained in the pressure-measuring device manufactured using the method according to the present invention.

FIG. 3 shows a DETF (Double Ended Tuning Fork) resonating structure, seen in plan view, together with excitation and detection elements as in a preferred embodiment.

In this figure, the resonating element 8 features two parallel arms 9 and 10 that vibrate laterally. The resonating element is fixed to the diaphragm 1 using connection portions 11 and 12. Said portions 11 e 12 (referred as detection element) are electrically insulated from the rest of the system using a separating cavity 13. Their function is to detect the frequency signal proportional to the pressure applied to the diaphragm at the ends of the resonating element 8.

Likewise, two other portions of diaphragm 14 and 15 (referred as excitation element) are made in such a way as to enable the resonating element 8 to be excited. They are also electrically insulated from the rest of the system using the cavity 13. The cavity 13 also extends under the resonating element 8 to enable it to vibrate freely.

Elements 11 and 12 are partially covered by layers 16 and 17 of suitably-shaped metal material to facilitate the transmission of the detection signal to the outside environment.

Likewise, elements 14 and 15 of the diaphragm are covered by metal layers 18 and 19 that are used to carry the excitation signal to the sensor.

Figures 4, 5:
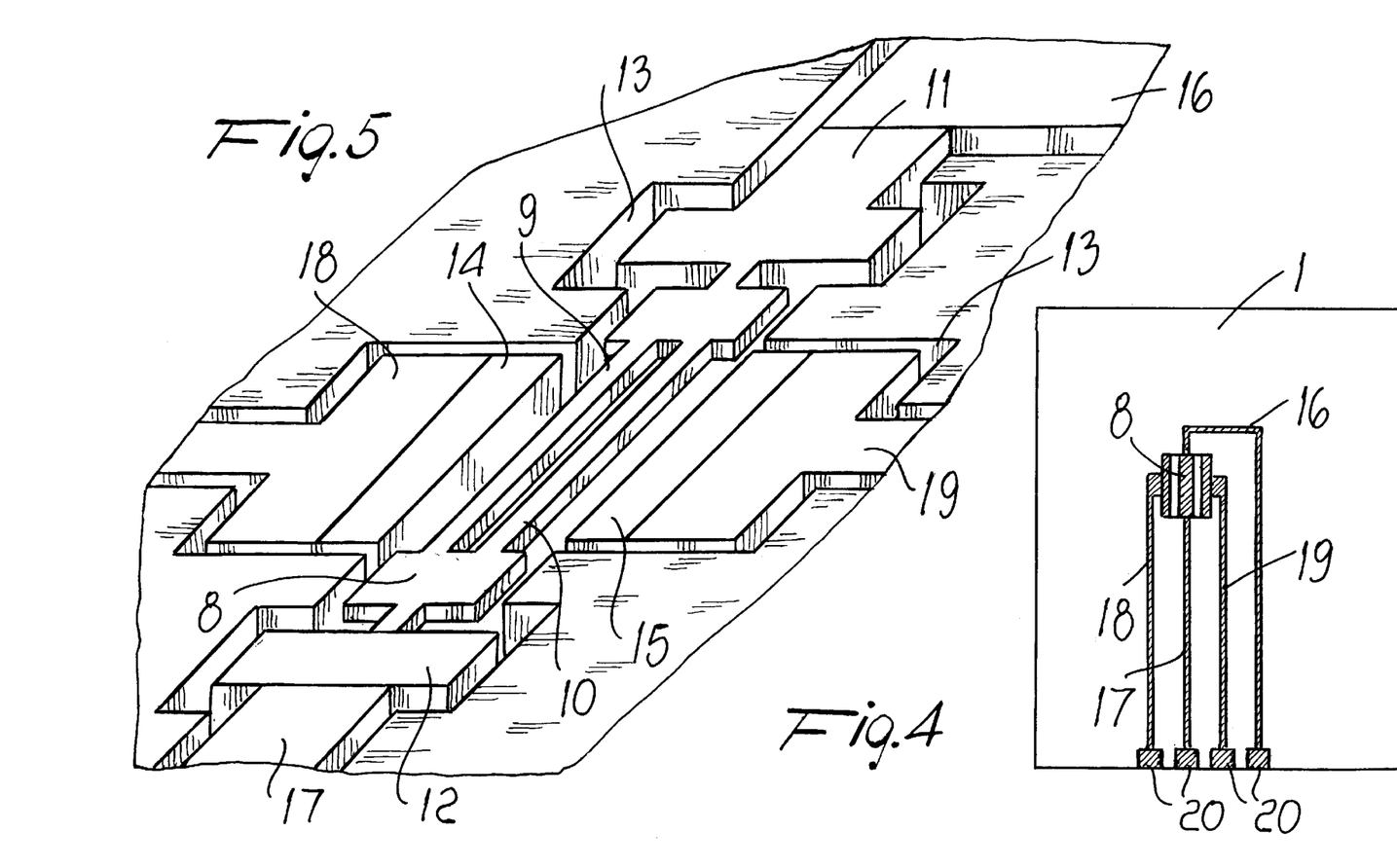
FIG. 4 is a plan view of the diaphragm with the related electrical connections for the excitation element and for the detection element.
FIG. 5 is a view in perspective of the resonating element shown in FIG. 3.

FIG. 4 shows a plan view of the diaphragm from which the resonating structure and excitation and detection elements are obtained using the method as in the present invention.

Electrical connections 16, 17, 18 and 19 in order to transmit the excitation and detection signals, are connected to pad contacts, (indicated in the figure by reference number 20) that are used for the external connections.

FIG. 5 shows a view in perspective of the zone of the diaphragm 1 close to the resonating element.

Figure 6:
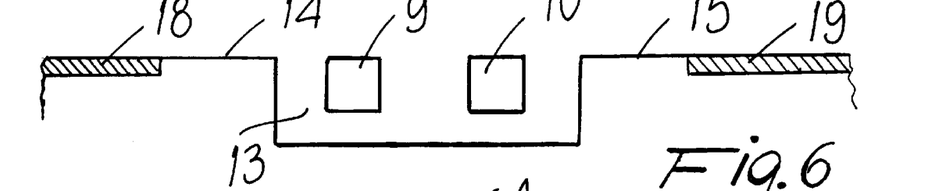
FIG. 6 is a sectional view along the line VI—VI in FIG. 3.

FIG. 6, on the other hand, shows a section view along line VI—VI in FIG. 3.

Referring to the pressure measuring device of FIG. 2, the method as in the invention, can be divided into three main parts:

i) Machining a multilayer semiconductor material to obtain a diaphragm 1 having on the upper side a resonating element 8, an excitation element and a detection element. Said diaphragm is exposed to the pressure of a process fluid P2. The detection element detect a signal proportional to the pressure of the process fluid while the excitation element provides the energy to maintain the vibration of the resonating element;

ii) Machining the support layer 6 to create one or more a pressure ports (indicated by reference 21);

iii) Bonding the diaphragm 1 and the support layer 6.

The phases indicated above by i) and ii) can advantageously be carried out in parallel. The machining to create a cavity in said intermediate layer allowing free vibration of the resonating element.

Figure 7:
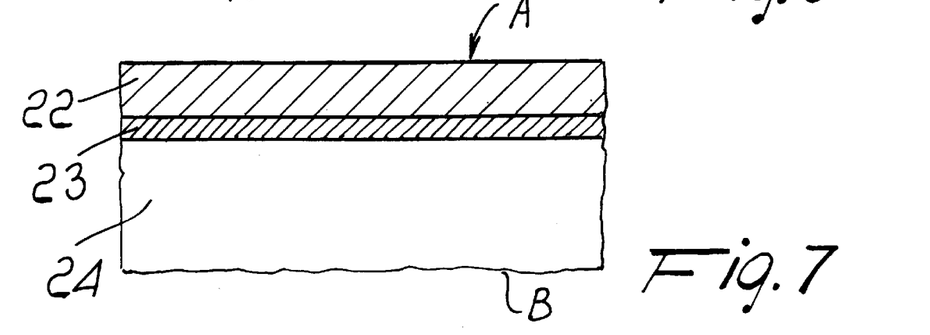
FIG. 7 shows a multilayer structure of semiconductor material for manufacturing the diaphragm of the pressure-measuring device using the method according to the present invention.

With reference to FIGS. 2 and 7, the machining phase i) is carried out on the surface of the wafer indicated as "A" in FIG. 7.

Figure 8A:
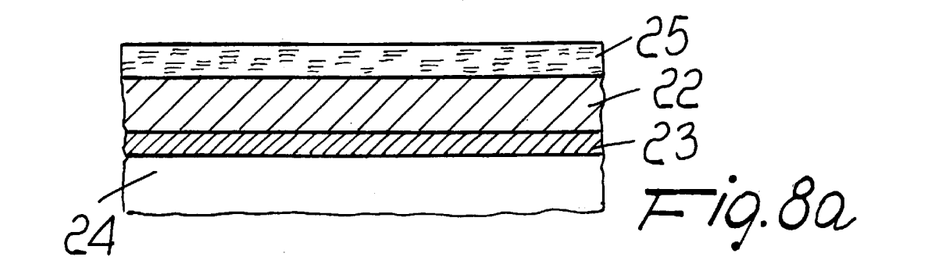
FIGS. 8a–8g show steps of the method as in the invention to obtain the diaphragm, an excitation element, a detection element.
Figures 8B, 8C:
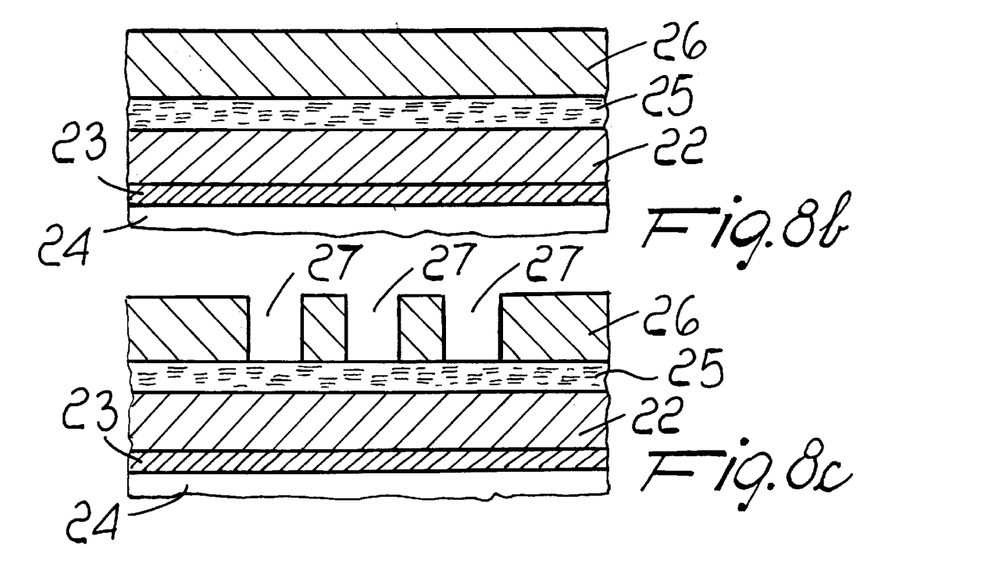
Figure 8D:
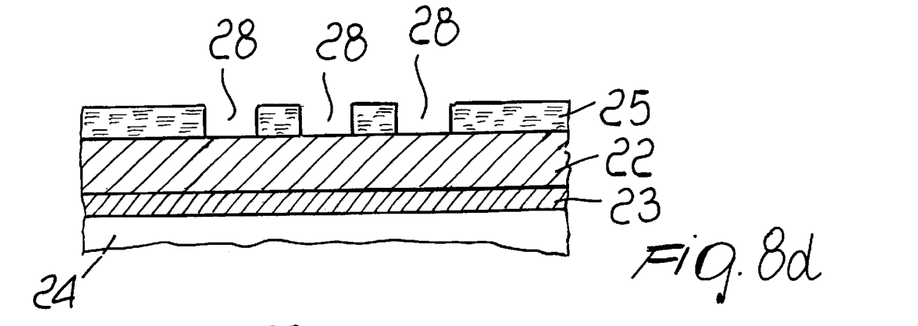
Figures 8E, 8F:
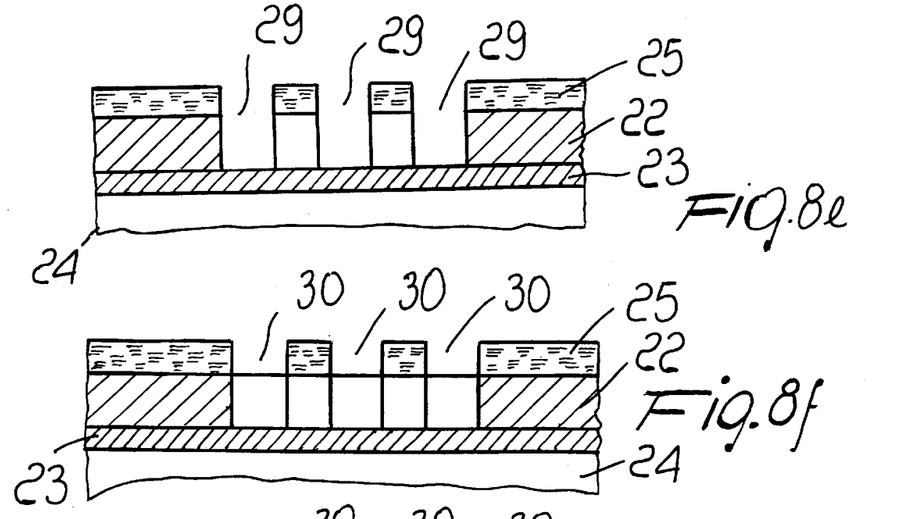

Referring to FIGS. 8a–8g, the step a) comprises:

depositing a layer of protective material 25 (SiO2 for example) on the surface referred as "A" of the top layer 22 of the three layer semiconductor material (FIG. 8a);

depositing of a layer of photosensitive material 26 (resist for example) (FIG. 8b);

removing portions 27 in the layer of resist 26 (FIG. 8c) using a suitable photolithographic process. The selective removal of certain portions of the layer 26 is possible making them sensitive to the action of chemical agents thanks to exposure to the light radiation used in the photolithographic process. The layer 26 can be used as a mask defining the profile of the resonating element, the excitation element 8 and the detection element;

removing the unmasked portions 28 in the layer 25;

selectively removing a portion of the layer 25. This removal can be performed using wet etching. The layer 25 can be used as a mask for the top layer 22;

removing the layer 26 (FIG. 8*d*);

removing the unmasked portions 29 in the layer 22 until reaching the intermediate layer 23 of the three-layer semiconductor material used (see FIG. 8*e*). A dry removal process can be used. Using a dry process allows to create highly anisotropic structures.

The structures of the resonating element 8, the indicated by iii) obviously can be carried out subsequently to the machining indicated by i) and ii).

Advantageously the process as in the invention can comprise the following phases:

iv) Machining the lower part of the diaphragm to obtain a protective structure 7 against overrange pressure pulses.

v) Making a bond on the lower side of said support layer 6 and a further support 3.

vi) Making a bond between the upper side of the diaphragm 1 and a protective layer 5. Advantageously the bonding of a protective layer 5 seals the cavity allowing the resonating element 8 to vibrate in high vacuum.

The machining advantageously uses a multilayer structure of semiconductor material made of three layers of semiconductor materials 22, 23 and 24 in FIG. 7 (respectively referred as top layer, intermediate layer and bottom layer). Such three-layer structure is present in semiconductor wafers which are already available on the market (SOI wafers for example). The use of such wafers guarantees the quality and repeatability of the structure on which machining is commenced.

The phase i) comprises the following steps:

a) machining the top layer to selectively remove portions of said top layer and define thereon the structures of the resonating element, the excitation element and the detection element;

b) creating metallized portions on said top layer in order to provide electrical connections to said excitation element and detection element; and c) selectively removing portions of the intermediate layer excitation and the detection elements are defined on the top layer 22.

masking with a layer of protective material 30 (such as resist, for example) the portion of the top layer 22 where the resonating element 8 has to be positioned.

removing the layer 25 (for example by chemical etching). This cannot remove the intermediate layer 23 thanks to the protective action of the layer 30. (See FIG. 8*g*). Alternatively the removal of layer 26 can be performed immediately before removing the layer 25.

Figures 8G, 9A:
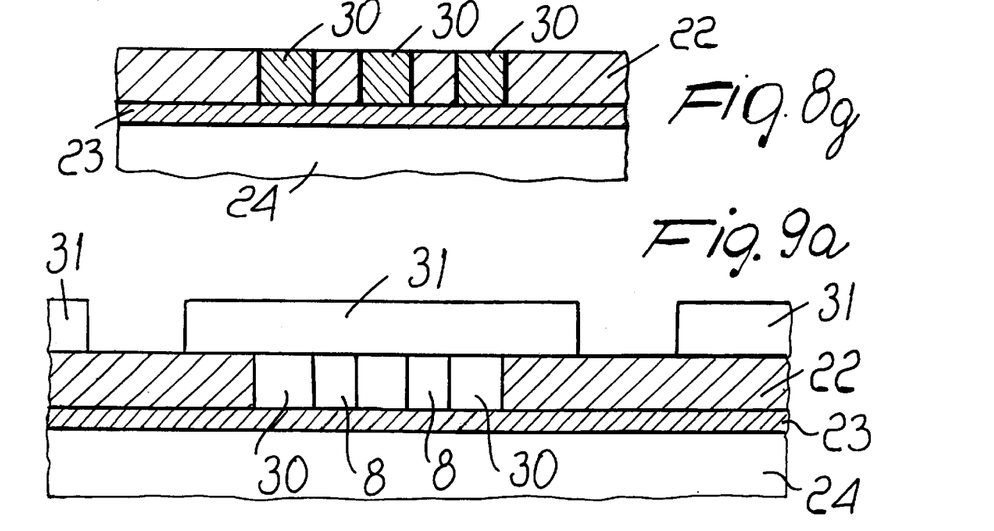
FIGS. 9a–9b, 10 and 11a–11c show steps of the method as in the present invention for forming the electrical connections of the excitation and detection elements.
Figure 9B:
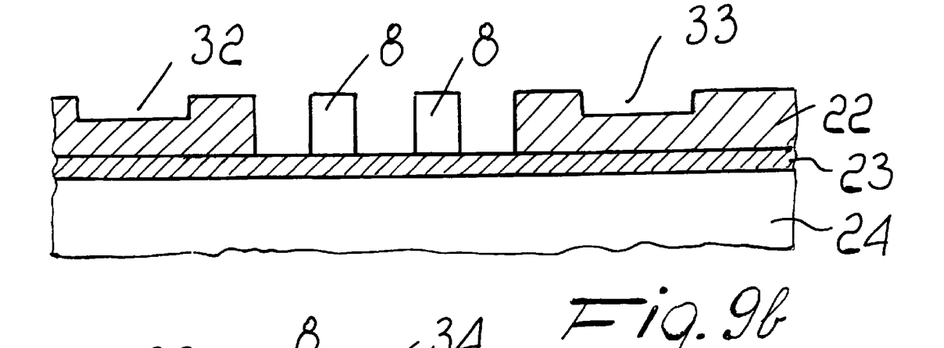
Figure 10:
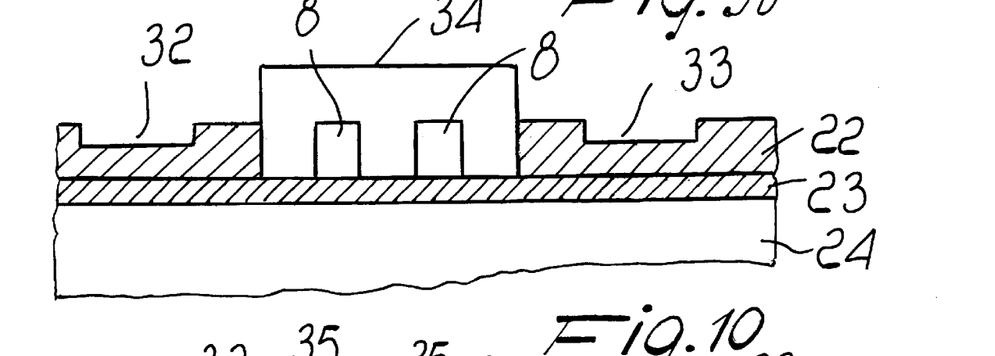
Figure 11A:
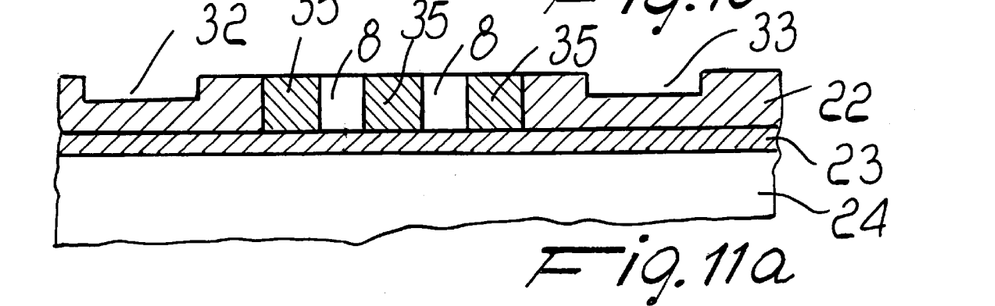
Figure 11B:
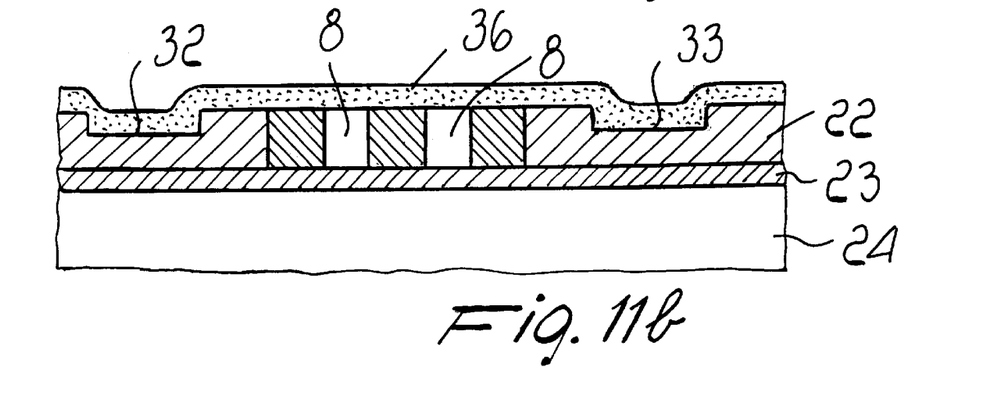
Figure 11C:
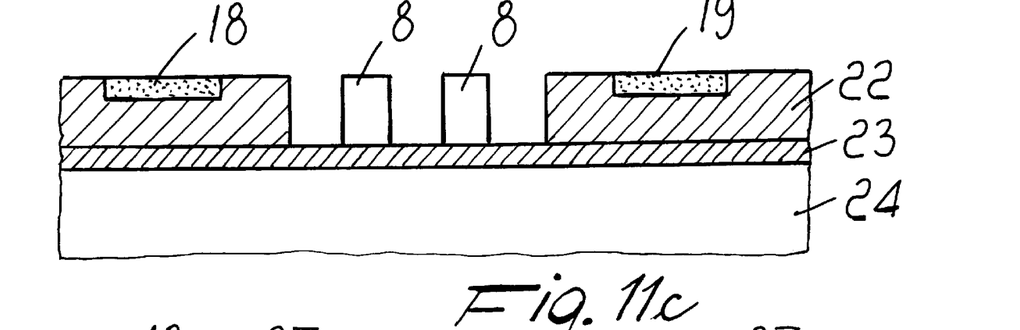

Referring to FIGS. 9*a*–9*c*, 10, 11*a*–11*c* step b) comprises:

covering surface "A" of the top layer 22 with a layer of protective material 31;

selectively removing portions of layer 31 creating a mask defining thereon the path of the electrical connections 16, 17, 18 and 19 (see FIG. 4 and 9*a*).

selectively removing portions of the top layer 22 (for example with partially anisotropic etching). This creates cavities 32 and 33 for the seatings of said electrical connections. This solution is particularly advantageous because it maintains the planarity of the surface "A" of the top layer 22 (see FIG. 7).

removing layers of protective material 30 and 31 (see FIG. 9*b*).

masking with a layer of protective material 34 (such as resist, for example) the portion of the top layer where the resonator has to be positioned (see FIG. 10).

selectively doping the unmasked portions of the top layer 22. Known ion implantation techniques can advantageously be used for the doping.

selectively removing the protective layer 34 from the surface "A" of the top layer 22 (see FIG. 11*a*).

covering the top layer 22 with a layer of metallic material 36. Sputtering or metal evaporation techniques can be used (see FIG. 11*b*). More layers of different metallic materials can be deposited;

masking the portions of layer 36 matching with seatings 32 and 33.

selectively removing the unmasked portions of layer 36.

removing all the protective material from the top layer 22 (FIG. 11*c*).

Figure 12A:
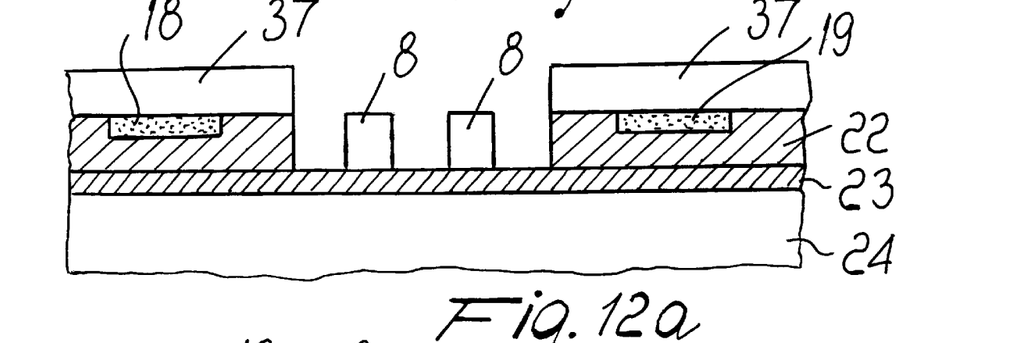
FIGS. 12a and 12b show the steps for forming a cavity beneath the resonator.
Figure 12B:
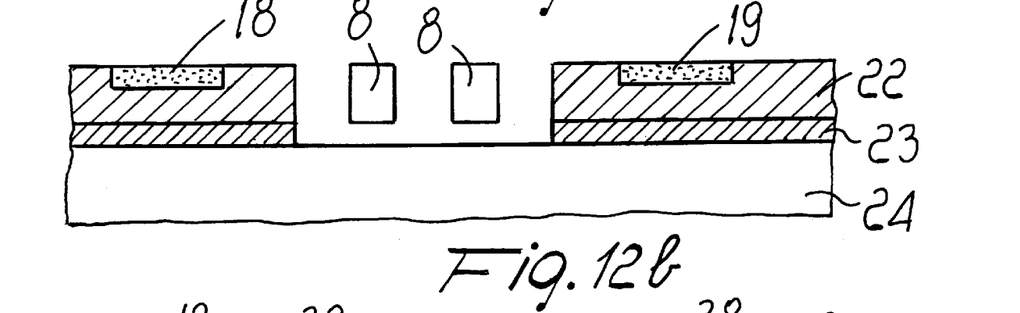

Alternatively step b) can comprises the following steps:

covering the top layer 22 with a layer of protective material;

selectively removing portions of said layer of protective material using photolithographic techniques to create a mask defining thereon the path of said electrical connections;

selectively removing the unmasked portions of the top layer creating cavities for the seatings of said electrical connections;

removing of said protective material;

masking the portion of the top layer, where said resonator has to be positioned, using a layer of protective material;

selectively doping the unmasked portions of the top layer;

masking with a layer of protective material the portion of the top layer 22 not occupied by the seatings of said electrical connections;

depositing metallic material into said seatings; and removing said protective material;

Referring to FIGS. 12*a*–12*b* the step c) comprises:

cleaning the top layer 22;

covering layer 22 with a layer 37 of protective material creating a mask with openings matching the area where the resonating element 8 is located (see FIG. 12*a*).

selectively removing the intermediate layer 23. The removal is limited to the portion of material below the resonating element 8. A cavity allowing free vibration of the resonating element is created.

removing the protective layer 37 (see FIG. 12*b*).

rinsing the three layer semiconductor material using solutions based for example on water, alcohol or hydrocarbons. Resist based solutions or commonly known freezing processes can be used to avoid stresses on the resonator when the wafer is dried.

The steps comprised in phase i) can be carried out advantageously in different orders such as:

1) Step a), step b) and step c);
2) Step a), step c) and step b).

Referring to FIGS. 2 and 7 phase iv) comprises:

depositing a layer of protective material on the bottom layer 24 (see FIG. 7) of said three-layer semiconductor material;

selectively removing said protective material to create a mask defining the contour of said protection structure 7 (see FIG. 2); and with the exception of the area of the resonating element 8. This can be achieved using masking techniques similar to those previously described. The layer of insulating material 38 can either be silicon dioxide or vitreous material and can be deposited using the techniques currently available, such as, for example, Plasma Enhanced Chemical Vapour Deposition, Low Temperature Oxidation, Low Pressure Chemical Vapour Deposition, Glass Sputtering, etc.

lapping layer 38. This can advantageously be performed before the bonding process to increase the layer's planarity.

bonding layers 1 and 5 in FIG. 2. It is possible to use advantageously thermal anodic processes and catalysing solutions such as, for example, sodium silicate. Alternatively other thermal bonding processes can be used. Phase iii) can be performed using the technologies described above.

Similarly, phase vi) can be implemented using the technologies described above.

As one can see, the invention described above fully achieves its set objectives in that the procedure as in the invention makes it possible to manufacture a resonating element on a silicon diaphragm using silicon machining technologies that enable one to perform the most critical machining on one side of the wafer only, integrating the excitation and detection elements and the resonating element with the structure itself, and performing the less critical processes on the underside of the wafer. In particular, the resonating element can vibrate in a high vacuum and moreover can be protected against considerable selectively removing the unmasked portion of the bottom layer of said three-layer semiconductor material. Chemical etching can be performed because it is anisotropic and exploits the different sensitivities of the various different crystalline planes of the layer 24 to the chemical agent; and removing said protective material.

This machining of the protective structure 7 can advantageously be performed independently from phase i).

Phase ii) relates to the machining of the layers 6 in FIG. 2, which features an opening for making the pressure port 21. Silicon wafers available on the market can be used. Techniques similar to those used in phase iv) can be adopted.

In an advantageous embodiment, layer 6 can feature a greater number of pressure ports 21 to enable easier flow of the process fluid in the zone beneath the diaphragm 1.

The phases iii), v) and vi) involve bonding processes of different layers in order to bond layers 1 and 5 of the device, layers 1 and 6, and layer 6 to a further support 3 (see FIG. 2).

Figure 13:
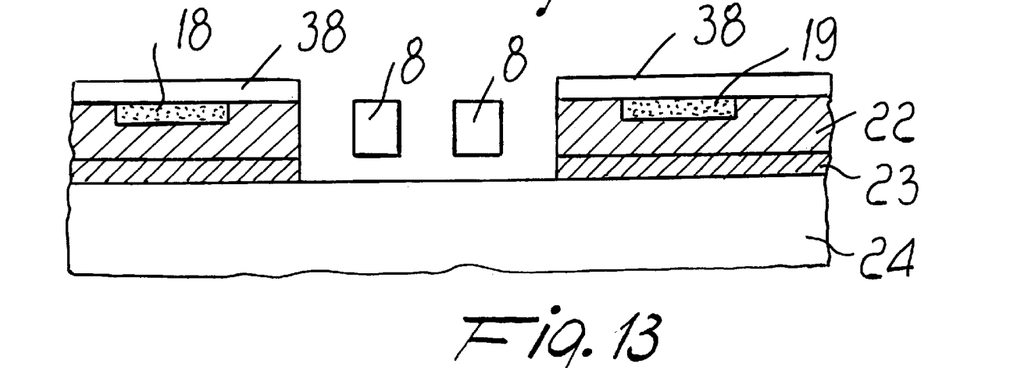
FIG. 13 shows, by way of example, a step for bonding different layers of the pressure-measuring device.

The phase for bonding layers 1 and 5 (phase v)) can be performed to enable the resonator 8 to be housed in a cavity that is kept at high vacuum. The machining is carried out on the surface "A" of the top layer 22. In a preferred embodiment phase v) can be divided into the following steps:

depositing a layer 38 (see FIG. 13) of insulating material on the surface "A" of the top layer 22. The deposition is performed on the entire surface of side "A" pressure pulses during operation.

The use of an SOI wafer allows to create monocrystalline silicon structures and therefore improve the mechanical performance of the resonator compared to structures that use other materials such as polysilicon and quartz.

As is known, the phase for doping the chip is carried out on the whole chip except for the resonating element. This choice has three advantages: in the first place the occurrence of gradients in the doping profile is avoided, in addition the occurrence of leakage current due to many electrons on the Si/covering SiO2 interface is avoided and, finally, simpler masks can be used.

The phases i), ii), iii), iv), v) and vi) can also be performed following a different order from that set out above, although it has been found that the above is the most logical process phase sequence for obtaining the pressure measuring device object of the invention.

The invention as conceived is capable of numerous modifications and variants that are all within the inventive concept; moreover, all the details may be substituted by other technically equivalent elements.

In practice, the dimensions and materials used can be of any kind to suit requirements and the state of technology providing they are compatible with the specific use.

What is claimed is:

1. A method for manufacturing a pressure-measuring device comprising a diaphragm of semiconductor material having a resonating element fixed thereto, said diaphragm being exposed to the pressure of a process fluid, comprising the following phases, whatever the order:

i) machining a multilayer semiconductor material to obtain a diaphragm having on the upper side a resonating element, an excitation element and a detection element for measuring the pressure applied to said diaphragm;

ii) machining a semiconductor material having one or more layers to obtain a support having a pressure port for the flow of the process fluid;

iii) making a bond between the lower side of said diaphragm and the upper side of said support.

2. The method of claim 1, further comprising the following phase:

iv) machining the lower part of the diaphragm to obtain a protective structure against overrange pressure pulses.

3. The method of claim 1, wherein the multilayer semiconductor material used in phase i) is a three-layer semiconductor material having a top layer, an intermediate layer and a bottom layer.

4. The method of claim 3, wherein the resonating element, the excitation element and related connections to the pad contacts and the detection elements and related connections to the pad contacts are created on the top layer of the three-layer semiconductor material.

5. The method of claim 3, wherein the bottom layer is machined to obtain a protective structure against overrange pressure pulses.

6. The method of claim 4, wherein the phase i) comprises the following steps:

a) machining the top layer to selectively remove portions of said top layer and define thereon the structures of the resonating element, the excitation element and the detection element;

b) creating metallized portions on said top layer in order to provide electrical connections to said excitation element and detection element; and c) selectively removing portions of the intermediate layer to create a cavity in said intermediate layer allowing free vibration of the resonating element.

7. The method of claim 6, wherein said step a) comprises:

depositing a layer of protective material on the surface of top layer;

depositing a layer of photosensitive material over said layer of protective material;

selectively removing portions of said photosensitive material using photolithografic techniques to create a mask defining the profile of the resonating element, excitation element and the detection element;

selectively removing the unmasked portions of said protective layer;

removing said mask of photosensitive material;

removing portions of said top layer not masked by said protective layer creating openings reaching said intermediate layer;

masking with a layer of protective material the portion of the top layer where the resonator has to be positioned; and removing said layer of protective material on the surface of the top layer.

8. The method of claim 7, wherein the removal of said mask of photosensitive material is carried out after making the openings in said top layer.

9. The method of claim 6, wherein said step b) comprises:

covering the top layer with a layer of protective material;

selectively removing portions of said layer of protective material using photolithographic techniques to create a mask defining thereon the path of said electrical connections;

selectively removing the unmasked portions of the top layer creating cavities for the seatings of said electrical connections;

removing of said protective material;

masking the portion of the top layer, where said resonator has to be positioned, using a layer of protective material;

selectively doping the unmasked portions of the top layer;

removing said protective layer from the surface of the top layer;

covering the top layer with one or more layers of metallic material;

masking the portion of said layer of metallic material matching the seatings of said electrical connections;

removing the unmasked portions of said layer of metallic material; and removing the protective material.

10. The method of claim 6, wherein said step b) comprises:

covering the top layer with a layer of protective material;

selectively removing portions of said layer of protective material using photolithographic techniques to create a mask defining thereon the path of said electrical connections;

selectively removing the unmasked portions of the top layer creating cavities for the seatings of said electrical connections;

removing said protective material;

masking the portion of the top layer, where said resonator has to be positioned, using a layer of protective material;

selectively doping the unmasked portions of the top layer;

masking with a layer of protective material the portion of the top layer not occupied by the seatings of said electrical connections;

depositing metallic material into said seatings; and removing said protective material.

11. The method of claim 6, wherein said step c) comprises:

cleaning the top layer of the three-layer material;

covering the top layer with a layer of protective material creating a mask with openings matching the area where the resonating element is positioned;

selectively removing the intermediate layer of said three-layer semiconductor material creating a cavity in said intermediate layer allowing free vibration of the resonating element;

removing said protective material; and rinsing said three-layer semiconductor material using cleaning solutions.

12. The method of claim 6, wherein the phase i) comprises the steps described in claim 6 with the following order:

step a), step b) and step c).

13. The method of claim 6, wherein said phase i) comprises the steps described in claim 6 in the following order:

step a), step c) and step b).

14. The method of claim 5, wherein the machining of the bottom layer comprises:

depositing a layer of protective material on the bottom layer of said three-layer semiconductor material;

selectively removing said protective material to create a mask defining the contour of said protection structure; and selectively removing the unmasked portion of the bottom layer of said three-layer semiconductor material; and removing said protective material.

15. The method of claim 1, further comprising the following phase:

v) making a bond on the lower side of said support and a further support.

16. The method of claim 1, further comprising the following phase:

vi) making a bond between the upper side of said diaphragm and a protective layer.

17. The method of claim 16, wherein said phase vi) comprises:

depositing an insulating layer on the portion of the top layer not comprising the resonating element;

lapping said insulating layer;

bonding said insulating layer and said protective layer.

18. The method of claim 16, wherein said bond of a protective layer seals the cavity in the intermediate layer of said three-layer semiconductor material allowing free vibration of the resonating element in high vacuum.

19. Pressure measuring device obtained according to the method of claim 1.

* * * * *